Dec. 28, 1965        R. S. ENABNIT        3,225,810

DIGITAL CODED ELASTOMERIC ARTICLE

Filed June 26, 1963

*INVENTOR.*
ROBERT S. ENABNIT

BY

*J. B. Holden*
ATTORNEY

United States Patent Office 3,225,810
Patented Dec. 28, 1965

3,225,810
DIGITAL CODED ELASTOMERIC ARTICLE
Robert S. Enabnit, Cuyahoga Falls, Ohio, assignor to The Goodyear Tire & Rubber Company, Akron, Ohio, a corporation of Ohio
Filed June 26, 1963, Ser. No. 290,724
11 Claims. (Cl. 152—330)

This invention relates to rubber articles having included therein information code forming components. More particularly, the invention relates to the placing of discrete elements of material susceptible to electromagnetic effects within a tire, thus forming a permanent identification system that can be readily adapted for integration with automatic control systems.

The present invention comprises small elements of an elastomeric substance that contain an electromagnetically different material. The material more susceptible to electromagnetic effects is combined with an elastomer to form elements that are then positioned within or on the structure of the tire during the building thereof. In the preferred embodiments the relationship in the positioning or sequence of the elastomeric elements forms an identification system in which the relative positions of the elements can be subsequently and repeatedly detected by temporarily magnetizing the electromagnetically susceptible material, or detecting the distortion of a magnetic field, as the elements of electromagnetically susceptible material pass by a suitable detector.

There are many ways in which tires are presently identified as to serial number, composition, and the facilities upon which the tire was built. The most common method is to produce numerals or letters in the form of cavities within the mold. This procedure results in raised numerals or letters upon the exterior surface of the cured tire. The identification thus produced is subject to wear or alteration which will destroy the identity of the tire. In contrast to raised identification upon the tire exterior, indented identification can be created on the tire by affixing raised numerals or letters with the tire mold. The indented identification has limitations in that the letters can fill in and also serve as a source of crack propagation in an area of the tire that is already exceedingly thin. Most identification has heretofore been placed on the tire sidewalls where the overall structure is at a minimum thickness. Additional methods of creating a coding system within the tire structure have been proposed. One such method is set forth in U.S. Patent 2,920,674 in which coding indicia are magnetically stored within the continuous wire structure of a tire as permanent magnetic field variations. The stored magnetic signals are then at any subsequent time played back from the wire structure within the tire, thus revealing its identification. The entire operation, as stated above, resembles the art of magnetic tape recording and replaying. The reliability of a magnetically stored information system suffers seriously in that a gradual demagnetization can occur in time, particularly when the tire is subjected to electrical machinery in which powerful magnetic fields are present. Then, too, the magnetic indicia can be purposely or accidentally removed, thus destroying forever the original code implanted within the tire. The reading out of such magnetic information is also affected by changes in magnetic fields when large masses of iron are near by such as is usually the case in tire plants. A further serious defect is the relatively small amount of information which can be thus stored because of the distance between wire structure and magnetizing and read-out devices.

The outstanding advantages of the present invention over conventional and other proposed methods of tire identification lie in the fact that, a permanent "passive" coding is produced which is an integral part of the tire structure. A very large amount of coded information can be thus stored because of the high definition of the code elements or bars. This relieves the necessity of moulding the information on the tire exterior and there is no permanent defacing of the tire. Once the coding method of the present invention is placed within or on a tire it is virtually impossible to destroy it without destroying the tire itself.

The term "electromagnetically susceptible" as used herein refers to magnetically susceptible and/or magnetizable characteristics of substances which substances include but are not limited to paramagnetic and dielectric substances.

While the preferred embodiment of the present invention is based upon the incorporation of paramagnetic substances within the body of the elastomeric article, the invention applies equally well to dielectrically different particles located within the elastomeric article and detected, for example, by electrically disturbing a signal from an alternating energy source passing over the elastomeric body and measuring the change in the signal generated, or that is received with a receiver positioned adjacent to the generator. Likewise, the code elements could comprise a material difference in electrical resistivity from the body of the elastomeric article.

The primary object of the present invention is to introduce within the structure of an elastomeric article a permanent passive code material.

Another object of the present invention is to impregnate rubber elements with a material more susceptible to electromagnetic effects than the rubber itself, then place the elements within or on the structure of a tire.

A further object of the invention is to introduce electromagnetically susceptible material in the form of an elastomeric cement into or on the tire structure.

Other objects and advantages will readily be apparent from the following description when taken in conjunction with the following drawings in which.

Figure 1:
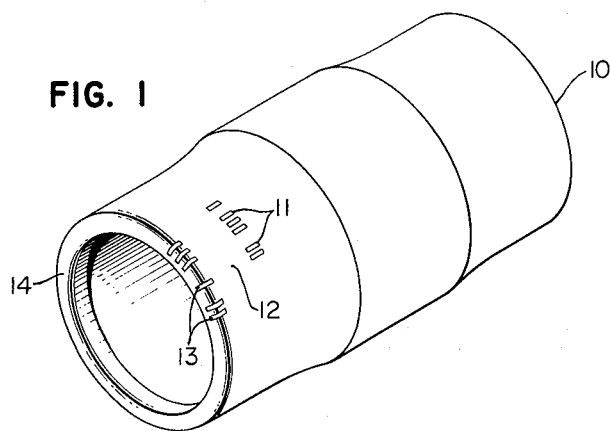
FIG. 1 is a perspective view of an uncured tire in which electromagnetically different rubber elements or bars have been positioned.

Referring to FIG. 1, an uncured tire 10 is shown in perspective with elements 11 located circumferentially around area 12 which will ultimately become the tire sidewall after the tire has been cured. Also shown are elements 13 situated around bead area 14. Elements 11 and 13 are produced from any convenient rubber compound that is compatible with the rubber or other elastomeric material used in this area of the tire. The rubber stock from which elements 11 and 13 are made is mixed with an electromagnetically susceptible material such as powdered iron or barium ferrite. The mixture of rubber and preferably barium ferrite is milled and calendered to approximately 0.020 inch (0.50 mm.) thick, then cut into appropriate sizes and inserted into or on the tire at the time during which the tire is built. Of course, the material could be extruded into a small cross sectional ribbon or any desired cross section without departing from the scope of the invention.

Figure 2:
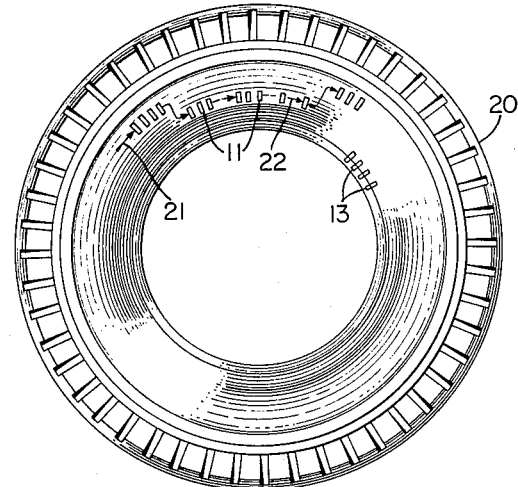
FIG. 2 is a plan view of a cured tire showing the relative position of the identification code elements or bars.

FIG. 2 shows a cured tire 20 containing identification elements 11 and 13 that are positioned in two circumferential rows around the tire sidewall. This system provides a method of expanding the capacity to store information. For example, the outer circumferential position 21 can be used to store general information, such as what plant the tire was built in or the compounds utilized in the tire. The outer circumferential row 21 can be used to direct the detector to another row such as 22, thus enabling a readout of more specific information such as the date manufactured and the actual builder who assembled the tire. By utilizing one or more rows of strategically placed electromagnetically susceptible elements, it is readily seen that there is practically an unlimited number of permutations that can be created. Such information elements or bars lead to ideal binary digital coding whereby one or more circumferentially aligned rows could provide a maximum foolproof system.

Figure 3:
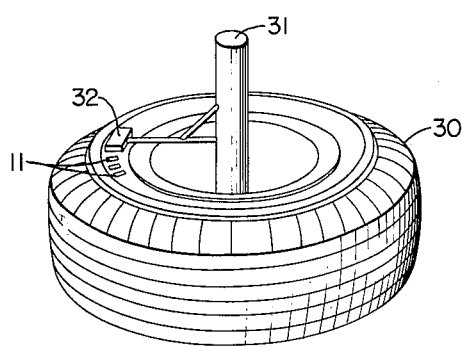
FIG. 3 is a perspective view of a cured tire and typical reading apparatus for extracting the coded identification.

FIG. 3 shows tire 30 mounted on a suitable detection machine 31. Tire 30 can rotate about the central axis of recorder 31 or else the tire can remain stationary, thus allowing pickup head 32 to move in close proximity to embedded rubber elements 11. Two of the principals upon which the extraction of information can be based are as follows:

First, the rubber-ferrite elements can be momentarily subjected to a magnetic field which will impart a positive degree of magnetism in each ferrite laden rubber element just prior to read out. The retained magnetism of each bar can then be detected with an ordinary detector such as a gaussmeter, thus producing an electrical pulse as the element or bar passes the readout head. The mode of operation and circuitry of various gaussmeters, etc. are well-known in the field of instrumentation and need not be further discussed herein. Second, the ferrite laden rubber elements can be made to pass near a permanent magnet coupled with a coil, thus creating a distortion in the magnetic field. In both of the above detection or readback systems the chain of electrical pulses produced duplicate the code originally placed physically into the tire. The coded information is dependent upon the intermittences of nonmagnetic spaces followed by the field disruptive or field producing ferrite laden rubber elements. This system of coding a tire or other elastomeric article is advantageous in that it is independent of the relative magnetization of the various elements, independent of the long term magnetic retentivity of the rubber elements, and in the latter case of detection even the short term magnetic retentivity. Thus, it can be seen that the identification so imparted is indestructible and cannot be removed short of destroying the tire itself.

Figure 4:
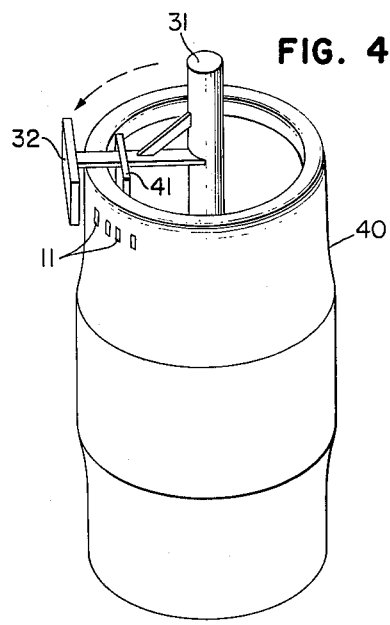
FIG. 4 is a view similar to FIG. 3 except that a typical reading apparatus including sending and receiving portions is shown with an uncured tire.

FIG. 4 shows an uncured tire 40 containing rubber elements 11. Reading apparatus 31 can easily be adapted by means of an adjustable head 32 to detect the variations in magnetic field distortion that are created by rubber elements 11. Head 32 can also be employed as a signal generating source, for example, light, X-ray, and microwave energy. The energy of head 32 is directed toward tire 40 and may be picked up by receiving head 41. Of course, the receiver need not be placed on the opposite side of the elastomeric article with respect to the position of the signal generator. The receiver could equally well be placed on the same side as the generator, still measuring energy loss or field distortion created by the code elements. The generator head 32 could also operate as a simultaneous detector by changes incurred because of power absorption, reflection, etc.

Thus, it can be determined that discrete particles of a dielectric material will also provide a means of reading out the physical position of the positive passive identification within the tire structure.

TEST PROCEDURE

In order to test the practicability of the invention a rubber stock of natural rubber containing appropriate vulcanizing compounds was milled with barium ferrite in the proportions of 200 grams of barrium ferrite

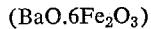

$(BaO.6Fe_2O_3)$ to 100 grams of rubber. The mixture was calendered and cut into elongated elements or bars approximately ½ x ¹⁄₁₆ x ¹⁄₃₂" (13.0 x 1.6 x 0.8 mm.). The elements were then placed on the sidewall of an experimental tire during the building stage. The tire was subsequently shaped and cured. The resulting circumferential row of elements was approximately 2.5" (6.4 cm.) from the inner bead edge prior to cure. The deformation of the tire from the curing operation resulted in an after-cure location of approximately 3.5" (8.9 cm.) from the bead edge. A simple frame was used to axially support the tire while it underwent rotation. A permanent bar magnet was held against the sidewall with one pole directed toward the tire and the tire rotated. The magnet was removed, a gaussmeter probe positioned in place of the bar magnet, and the output of the gaussmeter was visually displayed on an oscilloscope. The magnetizing field was approximately 1000 gauss. The retained magnetic intensity of the electromagnetic elements was between 2–8 gauss at a distance of approximately 0.125" (3.0 mm.) therefrom.

In addition to utilizing magnetically sensitive rubber elements or bars, a similar coding means can be produced by combining barium ferrite in a rubber cement. The resulting mixture can then be painted on an interior ply or the exterior of the tire during fabrication of the tire. The painted elements fuse with the tire rubber and can be considered as electromagnetically susceptible elements capable of being detected as heretofore described.

From the above description it can be determined that the present invention provides a novel method of physically implanting and magnetically reading out information from within or on a tire without distracting from the structural integrity thereof. This invention also provides a positive, high capacity, non-destructible method of coding a tire that will last for the life of the tire without a loss in resolution.

While certain representative embodiments and details have been shown for the purpose of illustrating the invention, it will be apparent to those skilled in this art that various changes and modifications may be made therein without departing from the spirit or scope of the invention.

I claim:

1. The method comprising the steps of mixing particles of an electromagnetically susceptible material with an elastomeric compound, processing the resulting mixture into the stock material, forming elements from said stock, placing said elements so that they are completely encapsulated within the structure of an elastomeric body during the making thereof in a predetermined physical pattern to create a positive identification system in which said elements are capable of being detected by electromagnetic means.

2. The method comprising the steps of mixing particles of a paramagnetic material with an elastomeric compound, processing the resulting mixture into stock material, cutting from said stock material discrete elements, placing said elements so that they are completely encapsulated within the sidewall structure of an uncured tire in a predetermined spaced apart pattern and positioned in at least one circumferentially aligned row about said sidewall, curing the tire so that said elements form an integral part thereof, thus creating a positive identification system in which the component elements are capable of being detected by electromagnetic means.

3. The method comprising the steps of mixing particles of a dielectrically different material with an elastomeric compound, processing the resulting mixture into stock material, cutting from said stock material discrete elements, placing said elements so that they are completely encapsulated within the sidewall structure of an uncured tire in a predetermined spaced apart pattern and positioned in at least one circumferentially aligned row about said sidewall, curing the tire so that said elements form an integral part thereof, thus creating a positive identification system in which the component elements are capable of being detected by electrical apparatus employing a signal generator and a signal receiver.

4. The method comprising the steps of mixing paramagnetic particles with an elastomeric cement, applying said mixture on the sidewall of a tire during the manufacturing stage thereof, so as to form a predetermined physical pattern, curing said tire so that the paramagnetic particles form an integral part of said tire, thus creating a positive identification system capable of being detected by electrical apparatus employing a magnetic field.

5. The method comprising the steps of mixing dielectrically different particles with an elastomeric cement, applying said mixture on the sidewall of a tire during the manufacturing stage thereof, so as to form a predetermined physical pattern, curing said tire so that the dielectric particles form an integral part of said tire, thus creating a positive identification system in which the information is capable of being detected by electrical apparatus employing a signal generator and a signal receiver.

6. The method as set forth in claim 2 wherein the magnetic material is barium ferrite.

7. The method as set forth in claim 4 wherein the paramagnetic particles are barium ferrite.

8. The combination comprising a pneumatic tire having completely encapsulated in the structure thereof electromagnetically susceptible elastomeric elements that contain a paramagnetic material, said elements placed around the tire in spaced relationship to one another to form a predetermined pattern that can be used to form a positive identification system in which the information is capable of being detected by electrical apparatus employing a magnetic field.

9. The combination comprising a pneumatic tire having completely encapsulated in the structure thereof electromagnetically susceptible elastomeric elements that contain a dielectrically different material, said elements placed around the tire in spaced relationship to one another to form a predetermined pattern that can be used to form a positive identification system in which the information is capable of being detected by electrical apparatus employing signal sending and receiving components.

10. The combination comprising a pneumatic tire having completely encapsulated in the sidewall plies thereof discrete rubber elements that contain a magnetic material, said elements radially aligned in at least one circumferential row so as to form a predetermined pattern that will provide a permanent positive identification system capable of being detected by electrical apparatus employing a magnetic field.

11. The combination as claimed in claim 10 wherein the magnetic material is barium ferrite.

References Cited by the Examiner

UNITED STATES PATENTS

| | | | |
|---|---|---|---|
| 873,541 | 12/1907 | Hagemann | 179—100.2 |
| 1,576,156 | 3/1926 | Swoboda | 152—353 X |
| 1,989,703 | 2/1935 | Leguillon | 161—146 |
| 2,920,674 | 1/1960 | Bull | 152—361 |
| 3,070,841 | 1/1963 | Schornstheimer. | |

ARTHUR L. LA POINT, *Primary Examiner.*

PHILIP ARNOLD, *Examiner.*